No. 798,185. PATENTED AUG. 29, 1905.
H. E. IRWIN.
VEHICLE TIRE.
APPLICATION FILED JUNE 2, 1904.

Witnesses:
H. J. McMillan
Wm H. Fulton

Inventor:
Herbert E. Irwin

UNITED STATES PATENT OFFICE.

HERBERT ELLWOOD IRWIN, OF GALESBURG, ILLINOIS.

VEHICLE-TIRE.

No. 798,185.   Specification of Letters Patent.   Patented Aug. 29, 1905.

Application filed June 2, 1904. Serial No. 210,765.

*To all whom it may concern:*

Be it known that I, HERBERT ELLWOOD IRWIN, a citizen of the United States, residing at Galesburg, in the county of Knox and State of Illinois, have invented certain new and useful Improvements in Vehicle-Tires, of which the following is a specification.

My invention relates to improvements in that class of pneumatic and solid-rubber tires that are especially adapted for use upon the wheels of motor-vehicles as well as carriages of all kinds.

An object of my invention is to construct a tire having the rubber compound extending into openings in the textile fabric and forming rootlets, as it were, to prevent the separation of the rubber from the fabric and the layers of fabric from each other.

Another object of my invention is to construct a tire-cover having its side walls built up with a sheet of rubber between each layer of rubber-coated fabric to produce a more flexible side wall than those built up completely of friction fabric.

A further object of this invention is to employ the use of securing-pins which are adapted to enter holes in the beads or flanges of the clencher type of tire in such a manner as to effectually lock the tire to the rim.

Also another object of the invention is to sever the bead portion of a tire-cover to permit of an easy application of the tire to the rim and a ready detachment therefrom and also to reinforce the tire-cover at the severed portion to prevent it from ripping or enlarging.

Still another object of my invention is to utilize a resilient core within the tire-casing.

These and such other objects as may hereinafter appear are attained by the devices shown in the accompanying drawings, forming a part of this specification, in which—

Figure 1:
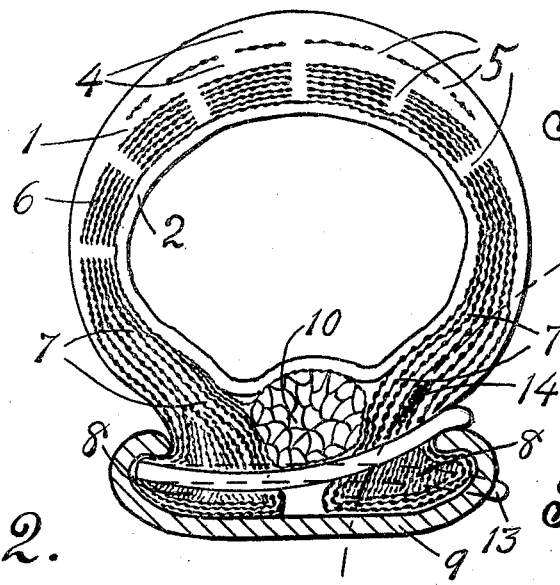
Figure 2:
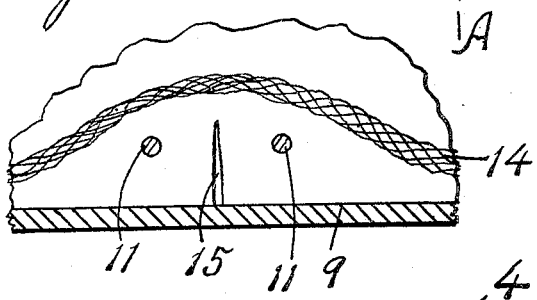
Figure 3:
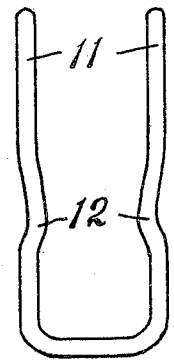
Figure 4:
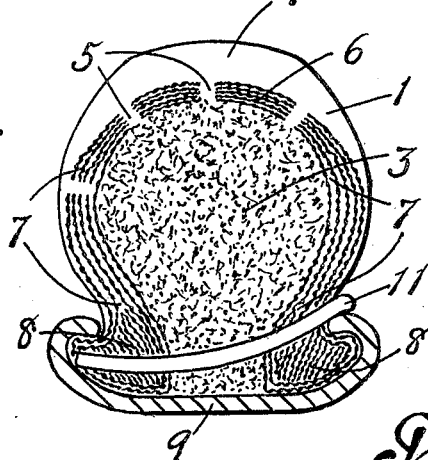

Figure 1 is a transverse section of my improved tire. Fig. 2 is a sectional view at line A A, Fig. 1. Fig. 3 is a plan view of a securing-pin. Fig. 4 is a modification of Fig. 1, showing a core of resilient material within the tire-casing.

Similar characters of reference indicate the same parts in the several figures of the drawings.

Referring by numerals to the accompanying drawings, 1 indicates the outer cover or casing of the tire, which incloses an air-tube 2 or a resilient core 3. Rootlets 5 of the rubber compound 4 extend into holes in the rubber-coated layers of fabric 6, between which are placed strips of sheet-rubber which extend up a portion of the side walls of the casing at 7 7. The casing at its inner periphery is provided with beads or flanges 8, the outer portion of which is adapted to lie under overhanging edges of the metallic rim 9. Between the flanges of the casing is a hinge-ring 10, which not only serves the purpose of a lock for the tire, but which also acts as a shelf and protection for the air-tube.

Securing-pin 11 is formed in a U shape and has kinks in it, as shown at 12. In Fig. 1 the locking-pin is shown in two positions—one as its head rests upon the edge of the rim and the other, at 13, as it is shown passing through holes in the side of the rim. The ends of the pin extend under one of the edges of the rim. Wire or fabric tape 14 is embedded in the casing above rent 15, which extends through the bead or flange to prevent the rent from enlarging or extending up the side of the casing.

At the present time pneumatic tires have a textile-fabric foundation to which an outer covering of rubber is vulcanized. It frequently happens that this rubber separates from the fabric, causing what is termed a "blister." Dirt and sand soon work their way into the tire at this point and cause the rubber to puff out. In this condition the rubber soon deteriorates and tears away, leaving the fabric exposed.

The fabric used in pneumatic tires is usually woven so firmly that the rubber in the vulcanizing process does not penetrate the fabric and unite with the rubber on the other side, but forms, as it were, minute rootlets which extend into recesses formed between the threads of the fabric. Furthermore, the little air particles that are in the threads of the fabric expand during the heated period of vulcanization and tend to expel the rubber when it is in a liquid state. The total adhering strength of the rubber compound to the fabric may therefore be considered equal to the total strength of the minute rootlets of a given area. The effect on a hard inflated pneumatic tire while moving rapidly in striking a projecting stone or other obstacle is similar to a hammer-blow, and a few of the minute rootlets at that point are likely to give way under the strain. A blister once started is rapidly enlarged because of the increased strain that is brought to bear upon the border rootlets. The method now attempted to overcome blistering is to place the very best quality of rubber next to the fabric. While this prolongs the life of the tire, it does not overcome the difficulty.

My method of lessening blistering in tires of all kinds is to make holes through a part or all of the layers of fabric, which may be accomplished by a hollow instrument when the tire is being built up. The rubber enters the holes thus made and firmly unites with the rubber between the layers of fabric, which not only anchors the outer rubber portion to the fabric, but also serves the purpose of riveting the layers of fabric together. In Fig. 1 I have shown a separate reinforcing-strip near the tread-surface with perforations through it. These perforations are filled with rubber and are considered as roots through the fabric.

The more compact the layers of fabric are in a pneumatic tire the stiffer are the side walls, and the more rubber placed between the layers of fabric the more flexible are the side walls of a tire. Since it is desirable that the side walls of the tire above the edges of the rim should be very flexible, I have inserted an extra sheet of rubber between the layers of fabric, as indicated at 7 in Figs. 1 and 4. Thus the side walls of the tire are possessed of a greater degree of flexibility than the tread portion, which is an advantageous feature, since the tire is almost continually bending at the side walls.

The hinge-ring 10 (shown in Fig. 1) was patented by myself under date of December 1, 1903, and is numbered 745,443. This hinge-ring forms a lock for the tire while it is under air-pressure; but it is desirable that a pneumatic tire should remain in place on the rim even though used deflated. In Figs. 1 and 4 I have shown a securing-pin which is preferably bent, so that when it is properly placed in position the beads on the tire edges are firmly held against the rim and are prevented from riding up. These pins remain in place on account of the kinks in them at 12; but by applying a tool to them they may be withdrawn, when the tire is easily removed from the rim.

To place the ordinary clencher-tire on a rim requires the stretching of the bead part, which makes the operation difficult. To facilitate the attachment and detachment of this class of tires, I have severed the beads in a few places, which greatly increases the circumference of the beads in placing the tires on or removing them from the rims. As the tires may rip at the severed portions, I have provided against this by embedding woven wire or textile fabric in the tire above such portions. The securing-pin may also straddle the severed portion, and thus prevent the tire from being ripped.

I have inserted a resilient core within the casing 4. This core is made of sponge-like rubber or other resilient material. The advantage of such a core is evident, as it affords a resilient tire without danger of collapsing, such as is incident to pneumatic tires. This tire is secured to the rim by means of the pin 11, which passes through the beads of the outer casing and the lower portion of the inner core.

Changes in the form of the tires, as well as in the securing-pins, may be made without departing from the spirit of my invention, and all such changes are contemplated by the following claims.

Having thus described my invention, what I claim, and desire to secure by Letters Patent, is—

1. An elastic or pneumatic vehicle-tire having flanges on its inner periphery adapted to lie under overhanging sides of a channeled wheel-rim, said tire being constructed of layers of textile fabric and rubber compound, the said layers having holes inserted in them adapted to receive the rubber compound, and pins lying transversely with reference to the channeled rim and passing through openings in each of the flanges and across the space between said flanges preventing same from rocking up, one end of said pins remaining exposed whereby they may be withdrawn and the tire thereby unlocked from the wheel-rim, substantially as described.

2. An elastic or pneumatic vehicle-tire having flanges on its inner periphery adapted to lie under overhanging sides of a channeled wheel-rim, said tire being constructed of layers of textile fabric and rubber compound, the said layers having insertions made therein to receive the rubber compound whereby a root-like connection is had between them, said flanges being severed and reinforcing means arranged above the severed portions, substantially as described.

3. An elastic or pneumatic vehicle-tire having flanges on its inner periphery adapted to lie under overhanging sides of a channeled wheel-rim, said tire being constructed of rubber-coated layers of fabric and having outside of the layers of fabric a rubber compound, between the said rubber-coated layers of fabric at the sides of the tire only being placed a thin sheet of rubber, and pins lying transversely with reference to the channeled rim and passing through openings in each of the flanges and across the space between said flanges preventing same from rocking up, one end of said pins remaining exposed whereby they may be withdrawn and the tire thereby unlocked from the wheel-rim, substantially as described.

4. An elastic or pneumatic vehicle-tire having flanges on its inner periphery adapted to lie under overhanging edges of a wheel-rim, said tire being constructed of rubber-coated layers of fabric and a rubber compound outside of same, and having adjacent to and above the edges of the rim a thin sheet of rubber placed between the said layers of fabric, said flanges being severed and reinforcing means provided above such portions, substantially as described.

5. An elastic or pneumatic vehicle-tire having flanges on its inner periphery adapted to lie under overhanging sides of a one-piece channeled wheel-rim and metallic pins placed at intervals extending laterally from opposite sides of the rim arranged to penetrate each flange, one end of said pins being arranged to rest upon the edge of the rim and the opposite end of the pins under the corresponding rim edge, substantially as described.

6. An elastic or pneumatic vehicle-tire having flanges on its inner periphery adapted to lie under overhanging sides of a channeled wheel-rim, and a pin arranged to pass through an opening in the side of said wheel-rim and to extend through each of said flanges under the opposite overhanging edge of the wheel-rim, substantially as described.

7. An elastic or pneumatic vehicle-tire having flanges on its inner periphery adapted to lie under overhanging sides of a channeled wheel-rim, and pins lying transversely with reference to the channeled rim and passing through openings in each of the flanges and across the space between said flanges preventing same from rocking up regardless of the pressure within the casing, one end of said pins remaining exposed whereby they may be withdrawn and the tire thereby unlocked from the wheel-rim, substantially as described.

8. An elastic or pneumatic vehicle-tire having flanges on its inner periphery adapted to lie under overhanging sides of a channeled wheel-rim, and a U-shaped pin arranged to pass laterally through openings in each of said flanges whereby the tire is secured to the rim, the loop end of the said pin being exposed so that it may be withdrawn, substantially as described.

9. An elastic or pneumatic vehicle-tire having flanges on its inner periphery adapted to lie under overhanging sides of a channeled wheel-rim, and a pin formed with a kink in it arranged to penetrate each of said flanges, an end of said pin remaining exposed so that it may be withdrawn thereby, substantially as described.

10. An elastic or pneumatic vehicle-tire having an outer casing with flanges on its inner side adapted to lie under overhanging edges of a channeled rim, the said casing inclosing an inner core of porous rubber or other flexible material, and pins arranged to pass through the said flanges and through the inner core, substantially as described.

11. An elastic or pneumatic vehicle-tire having flanges on its inner side adapted to lie under overhanging sides of a rim, said flanges being severed and a U-shaped pin arranged to enter holes in the flanges on each side of the severed portions, substantially as described.

12. An elastic or pneumatic vehicle-tire having flanges on its inner side adapted to lie under overhanging sides of a rim, said flanges being severed and reinforcing means arranged above the said severed portions, substantially as described.

13. An elastic or pneumatic vehicle-tire having flanges on its inner side adapted to lie under overhanging sides of a rim, said flanges being severed at intervals, and reinforcing means embedded in the tire above the severed portions, substantially as described.

In testimony whereof I have signed my name to this specification in presence of two subscribing witnesses.

HERBERT ELLWOOD IRWIN.

Witnesses:
J. PAUL IRWIN,
LYNN N. IRWIN.